(12) United States Patent
Kataoka et al.

(10) Patent No.: US 10,921,267 B2
(45) Date of Patent: Feb. 16, 2021

(54) X-RAY FLUORESCENCE ANALYSIS METHOD, X-RAY FLUORESCENCE ANALYSIS PROGRAM, AND X-RAY FLUORESCENCE SPECTROMETER

(71) Applicant: RIGAKU CORPORATION, Tokyo (JP)

(72) Inventors: Yoshiyuki Kataoka, Takatsuki (JP); Kosuke Kawakyu, Takatsuki (JP)

(73) Assignee: Rigaku Corporation, Akishima (JP)

( * ) Notice: Subject to any disclaimer, the term of this patent is extended or adjusted under 35 U.S.C. 154(b) by 0 days.

(21) Appl. No.: 16/559,063

(22) Filed: Sep. 3, 2019

(65) Prior Publication Data
US 2020/0003712 A1    Jan. 2, 2020

Related U.S. Application Data

(63) Continuation of application No. PCT/JP2018/010004, filed on Mar. 14, 2018.

(30) Foreign Application Priority Data

Mar. 15, 2017    (JP) .................................. 2017-049447

(51) Int. Cl.
   *G01N 23/223*    (2006.01)
(52) U.S. Cl.
   CPC ..... *G01N 23/223* (2013.01); *G01N 2223/076* (2013.01); *G01N 2223/60* (2013.01)
(58) Field of Classification Search
   CPC ............. G01N 23/223; G01N 2223/60; G01N 2223/076; G01N 23/207
   See application file for complete search history.

(56) References Cited

U.S. PATENT DOCUMENTS

| | | | |
|---|---|---|---|
| 5,062,127 A | 10/1991 | Sayama et al. | |
| 6,314,158 B1 * | 11/2001 | Shiota | G01N 23/223 378/48 |
| 7,961,842 B2 * | 6/2011 | Kawahara | G01N 23/223 378/44 |

(Continued)

FOREIGN PATENT DOCUMENTS

| | | |
|---|---|---|
| CN | 104111263 A | 10/2014 |
| JP | 2012-063224 A | 3/2012 |

(Continued)

OTHER PUBLICATIONS

Wikipedia artilce on Mass Fraction: [retrieved on Jun. 9, 2020]. Retrieved from the internet: <URL: https://en.wikipedia.org/wiki/Mass_fraction_(chemistry)>. (Year: 2020).*

(Continued)

*Primary Examiner* — Christine S. Kim
(74) *Attorney, Agent, or Firm* — Sughrue Mion, PLLC

(57) ABSTRACT

An X-ray fluorescence analysis method according to an FP method uses a predefined theoretical intensity formula in a standard sample theoretical intensity calculation step for obtaining a sensitivity constant and in an unknown sample theoretical intensity calculation step during iterative calculation. In the formula, only in an absorption term relating to absorption of X-rays, a mass fraction of each component is normalized so that a sum of the mass fractions of all components becomes 1.

5 Claims, 4 Drawing Sheets

(56) References Cited

U.S. PATENT DOCUMENTS

| | | | |
|---|---|---|---|
| 9,784,699 B2* | 10/2017 | Zarkadas | G01N 23/2206 |
| 9,945,796 B2* | 4/2018 | Terashita | G01N 23/223 |
| 10,082,475 B2* | 9/2018 | Hara | G01N 23/207 |
| 2003/0118148 A1* | 6/2003 | Kataoka | G01J 3/443 |
| | | | 378/44 |
| 2004/0066886 A1* | 4/2004 | Elam | G01N 23/223 |
| | | | 378/45 |
| 2010/0272232 A1 | 10/2010 | Pesce et al. | |
| 2011/0103547 A1* | 5/2011 | Ohzawa | G01N 23/223 |
| | | | 378/45 |
| 2018/0348150 A1* | 12/2018 | Vrebos | G01N 23/223 |

FOREIGN PATENT DOCUMENTS

| | | |
|---|---|---|
| JP | 2015-031555 A | 2/2015 |
| WO | 03/001190 A1 | 1/2003 |
| WO | 2015/056305 A1 | 4/2015 |

OTHER PUBLICATIONS

J.W. Criss, et al., "Calculation Methods for Fluorescent X-Ray Spectrometry", Analytical Chemistry, U.S. Naval Research Laboratory, 1968, pp. 1080-1085, vol. 40, No. 7.

W.K. Jongh, "X-Ray Fluorescence Analysis Applying Theoretical Matrix Corrections. Stainless Steel", X-Ray Spectrometry, 1973, pp. 151-158, vol. 2.

Communication dated Dec. 25, 2019 from the State Intellectual Property Office of the P.R.C. in application No. 201880012059.9.

Liu, M.., et al., "The Application of Fundamental Parameters Method in EDXRF Based on SDD", Nuclear Electronics & Detection Technology, vol. 32, No. 9, 2012, pp. 1096-1099; p. 1104 (5 pages total).

Communication dated Mar. 31, 2020, from the European Patent Office in application No. 18767402.3.

The State Intellectual Property Office of the P.R. Of China Communication dated Oct. 13, 2020 issued in Application No. 2018880012059.9.

* cited by examiner

X-RAY FLUORESCENCE ANALYSIS METHOD, X-RAY FLUORESCENCE ANALYSIS PROGRAM, AND X-RAY FLUORESCENCE SPECTROMETER

CROSS REFERENCE TO THE RELATED APPLICATION

This application is a continuation application, under 35 U.S.C. § 111(a), of international application No. PCT/JP2018/010004, filed Mar. 14, 2018, which claims priority to Japanese patent application No. 2017-049447, filed Mar. 15, 2017, the entire disclosure of which is herein incorporated by reference as a part of this application.

BACKGROUND OF THE INVENTION

Field of the Invention

The present invention relates to an X-ray fluorescence analysis method, an X-ray fluorescence analysis program, and an X-ray fluorescence spectrometer according to a fundamental parameter method.

Description of Related Art

Conventionally, a fundamental parameter method (FP method) has been known as an X-ray fluorescence analysis method including: irradiating a sample with primary X-rays; measuring intensities of secondary X-rays such as fluorescent X-rays generated from the sample; and performing qualitative analysis of, for example, the mass fractions (sometimes represented by contents) of components (elements or compounds) in the sample based on the measured intensities (refer to Non-Patent Literature 1). In the FP method, as shown in the flowchart of FIG. 4, a sensitivity constant for correcting apparatus sensitivity is obtained in advance based on the measured intensity and a theoretical intensity of a standard sample (steps S1 to S3). Then, as for an unknown sample, mass fractions of the components thereof are obtained (step S10) based on an initial value of each mass fraction appropriately estimated based on the measured intensity and the sensitivity constant (steps S4 to S6) through iterative calculation using a theoretical intensity (steps S7C to S9).

In the conventional FP method, it is assumed that a standard sample in which a sum of the mass fractions of all components is 1 is used. In a normalization step S8.1 in the iterative calculation, an estimated mass fraction of each component, which has been updated in an update step S8, is divided by a sum of estimated mass fractions of all the components, thereby normalizing the estimated mass fraction of each component so that the sum of the estimated mass fractions of all the components becomes 1. In addition, according to the above assumption, in a standard sample theoretical intensity calculation step S2C and an unknown sample theoretical intensity calculation step S7C, a theoretical intensity formula simply represented by the following formula (1) is used.

$$I_i^T = K_i W_i / \Sigma \mu_j W_j \quad (1)$$

In the formula (1), $I_i^T$ is a theoretical intensity of fluorescent X-rays of a measurement component i, $K_i$ is a constant of the fluorescent X-rays of the measurement component i, $W_i$ is a mass fraction of the measurement component i, j is a total absorption coefficient of a component j (including the measurement component i) in the sample, and $W_j$ is a mass fraction of the component j in the sample. On the assumption that a sum $\Sigma W_j$ of mass fractions of all components is not 1 in the formula (1), if normalization is performed by dividing each of a numerator and a denominator of a right-hand side by $\Sigma W_j$ so that the sum of the mass fractions of all the components becomes 1, the theoretical intensity $I_i^T$ is represent as follows.

$$I_i^T = K_i W_i^N / \Sigma \mu_j W_j^N \quad (2)$$

In formula (2), each superscript N indicates that the corresponding value has been normalized. $W_i^N = W_i / \Sigma W_j$ represents a mass fraction of the measurement component i after normalization, and $W_j^N = W_j / W_j$ represents a mass fraction of the component j in the sample after normalization. A sum $\Sigma W_j^N = \Sigma(W_j / \Sigma W_j)$ of the mass fractions of all the components after normalization is 1. As is understood from comparison of the formula (1) with the formula (2), in the theoretical intensity formula used in the conventional FP method, the theoretical intensity $I_i^T$ of the measurement component i does not depend on the absolute mass fraction $W_j$ of each of the components j in the sample but depends on a proportion $(W_1:W_2:W_3 \ldots)$ of the mass fractions $W_j$ among the components j in the sample. Therefore, if the proportion is the same, the same theoretical intensity $I_i^T$ is calculated for the measurement component i regardless of whether or not the sum $\Sigma W_j$ of the mass fractions of all the components is 1.

For example, in a sample composed of two components of Fe and Ni, when the mass fractions of Fe and Ni are 0.54 and 0.36, respectively, and the sum of the mass fractions is 0.9, the theoretical intensity of each of Fe and Ni becomes the same as in the case where the mass fractions of Fe and Ni are 0.6 and 0.4, respectively, and the sum of the mass fractions of all the components is 1 (each mass fraction is normalized in this case), because 0.54:0.36=0.6:0.4.

Meanwhile, a calibration curve method has been known as a method in contrast with the FP method. In a semi-fundamental parameter (SFP) method for the calibration curve method, a calibration curve is corrected by using matrix correction factors, relating to absorption of X-rays, obtained through theoretical intensity calculation (refer to Non-Patent Document 2). In a correction formula used in the SFP method, one component is used as a base component (so-called balance), and a mass fraction of the base component is set to a value obtained by subtracting, from 1, a sum of mass fractions of components other than the base component, thereby normalizing the mass fraction of each component so that the sum of the mass fractions of all the components becomes 1.

RELATED DOCUMENT

Non-Patent Document

[Non-Patent Document 1] J. W. Criss, L. S. Birks, "Calculation Methods for Fluorescent X-Ray Spectrometry", Analytical Chemistry, 1968, Vol. 40, p. 1080-1086

[Non-Patent Document 2] W. K. Jongh, "X-Ray Fluorescence Analysis Applying Theoretical Matrix Corrections. Stainless Steel", X-ray spectrometry, 1973, Vol. 2, p. 151-158

SUMMARY OF THE INVENTION

In a standard sample, the sum of the mass fractions of known components is often not 1. In the SFP method, when a calibration curve is made by using a standard sample in which the sum of the mass fractions of known components is 0.98 and an unknown sample having the same composition is analyzed, an adequate analysis result indicating that the sum of the mass fractions of all the components is substantially 0.98 is obtained. However, in the FP method, when a sensitivity constant is obtained by using a standard sample in which the sum of the mass fractions of known components is 0.98 and an unknown sample having the same composition is analyzed, an inadequate analysis result indicating that the sum of the mass fractions of all the components is substantially 1 is obtained because of the aforementioned reason regarding the theoretical intensity formula, which may result in a significant analysis error. Therefore, in the FP method, in order to realize accurate analysis, only a standard sample in which the sum of the mass fractions of known components is 1 or extremely close to 1 can be used.

The present invention has been made in view of the above conventional problems, and an object of thereof is to provide an X-ray fluorescence analysis method, an X-ray fluorescence analysis program, and an X-ray fluorescence spectrometer according to the FP method, which enable accurate analysis even when a standard sample in which the sum of the mass fractions of known components is not 1.

In order to attain the aforementioned object, an X-ray fluorescence analysis method according to a first aspect of the present invention includes: a standard sample measurement step of irradiating a standard sample, which contains elements or compounds as components and whose composition is known, with primary X-rays, and measuring an intensity of fluorescent X-rays generated from the component in the standard sample; a standard sample theoretical intensity calculation step of calculating a theoretical intensity of the fluorescent X-rays generated from the component in the standard sample, based on a mass fraction of the component in the standard sample, by using a predefined theoretical intensity formula; and a sensitivity constant calculation step of calculating a sensitivity constant, based on the intensity measured in the standard sample measurement step and the theoretical intensity calculated in the standard sample theoretical intensity calculation step.

Then, the X-ray fluorescence analysis method according to the first aspect includes: an unknown sample measurement step of irradiating an unknown sample, which contains elements or compounds as components and whose composition is unknown, with the primary X-rays, and measuring an intensity of fluorescent X-rays generated from the component in the unknown sample; a conversion step of converting the intensity measured in the unknown sample measurement step into a theoretical intensity scale by using the sensitivity constant, to obtain a converted measured intensity; and an initial value assumption step of assuming an initial value of an estimated mass fraction for the component in the unknown sample.

Further, the X-ray fluorescence analysis method according to the first aspect includes: an unknown sample theoretical intensity calculation step of calculating a theoretical intensity of the fluorescent X-rays generated from the component in the unknown sample, based on a latest estimated mass fraction, by using the predefined theoretical intensity formula; an update step of updating the estimated mass fraction, based on the theoretical intensity calculated in the unknown sample theoretical intensity calculation step and on the converted measured intensity obtained in the conversion step; a convergence determination step of performing convergence determination, based on the estimated mass fractions before and after update in the update step and on a predetermined convergence condition; and a result output step of outputting a latest estimated mass fraction as a mass fraction, to be obtained, of the component in the unknown sample. When a result of determination in the convergence determination step is "not converged", the convergence determination step is followed by the unknown sample theoretical intensity calculation step, whereas, when the result of determination in the convergence determination step is "converged", the convergence determination step is followed by the result output step.

Further more, in the X-ray fluorescence analysis method according to the first aspect, in the predefined theoretical intensity formula used in the standard sample theoretical intensity calculation step and the unknown sample theoretical intensity calculation step, the mass fraction of each component is normalized, only in an absorption term relating to absorption of X-rays, so that a sum of the mass fractions of all the components becomes 1.

The X-ray fluorescence analysis method according to the first aspect uses, in the FP method, the theoretical intensity formula in which, only in the absorption term relating to absorption of X-rays, the mass fraction of each component is normalized so that the sum of the mass fractions of all the components becomes 1. Therefore, the theoretical intensity of the measurement component depends on the absolute mass fraction of each of the components in the sample. Thus, even when a standard sample in which the sum of the mass fractions of known components is not 1 is used, accurate analysis can be performed.

In the X-ray fluorescence analysis method according to the first aspect, in the predefined theoretical intensity formula used in the standard sample theoretical intensity calculation step and the unknown sample theoretical intensity calculation step, the mass fraction of each component is normalized, only in the absorption term relating to absorption of X-rays, preferably by dividing the mass fraction of the component by the sum of the mass fractions of all the components. In this case, the mass fraction of each component in the absorption term can be easily normalized so that the sum of the mass fractions of all the components becomes 1.

In the X-ray fluorescence analysis method according to the first aspect, in the predefined theoretical intensity formula used in the standard sample theoretical intensity calculation step and the unknown sample theoretical intensity calculation step, the mass fraction of each component may be normalized, only in the absorption term relating to absorption of X-rays, by setting a mass fraction of a base component specified for each component to a value obtained by subtracting, from 1, a sum of mass fractions of components other than the base component.

A second aspect of the present invention is an X-ray fluorescence analysis program for causing an X-ray fluorescence spectrometer to execute the X-ray fluorescence analysis method according to the first aspect. A third aspect of the present invention is an X-ray fluorescence spectrometer provided with the X-ray fluorescence analysis program according to the second aspect. Also in the X-ray fluorescence analysis program according to the second aspect and the X-ray fluorescence spectrometer according to the third aspect, the same operation and effect as those of the X-ray fluorescence analysis method according to the first aspect can be obtained.

Any combination of at least two constructions, disclosed in the appended claims and/or the specification and/or the accompanying drawings should be construed as included within the scope of the present invention. In particular, any combination of two or more of the appended claims should be equally construed as included within the scope of the present invention.

BRIEF DESCRIPTION OF THE DRAWINGS

In any event, the present invention will become more clearly understood from the following description of preferred embodiments thereof, when taken in conjunction with the accompanying drawings. However, the embodiments and the drawings are given only for the purpose of illustration and explanation, and are not to be taken as limiting the scope of the present invention in any way whatsoever, which scope is to be determined by the appended claims. In the accompanying drawings, like reference numerals are used to denote like parts throughout the several views, and:

DESCRIPTION OF EMBODIMENTS

Figure 3:
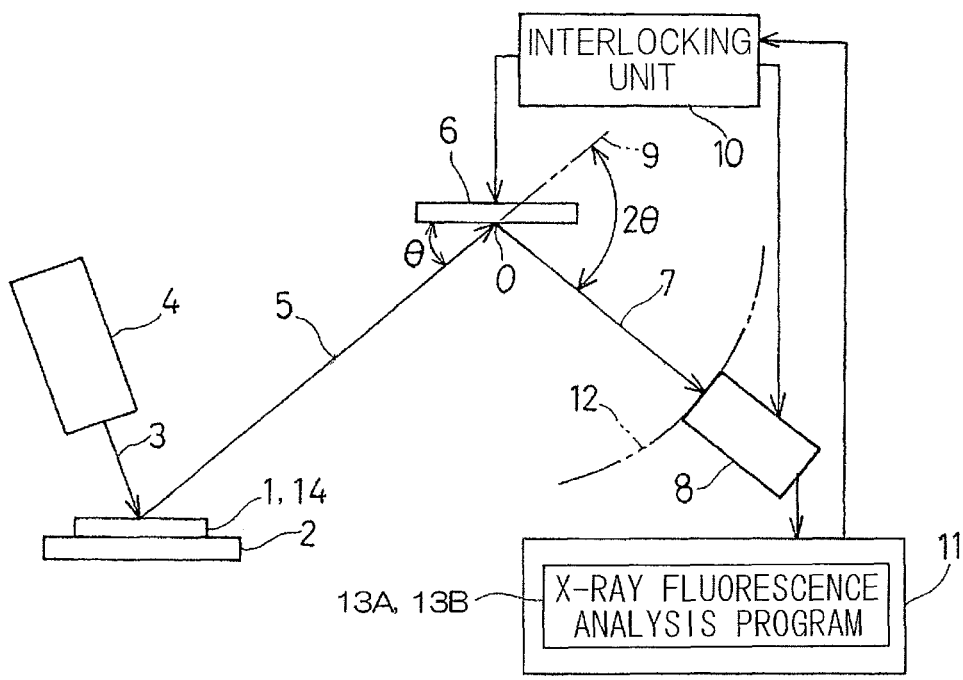
FIG. 3 is a schematic diagram showing an X-ray fluorescence spectrometer used for the X-ray fluorescence analysis methods according to the first and second embodiments.

Hereinafter, an X-ray fluorescence analysis method according to a first embodiment of the present invention will be described. First, an X-ray fluorescence spectrometer used for the X-ray fluorescence analysis method will be described. As shown in FIG. 3, this spectrometer is a sequential X-ray fluorescence spectrometer that irradiates a sample 1, 14 (including both an unknown sample 1 and a standard sample 14) with primary X-rays 3, and measures intensities of generated secondary X-rays 5. The X-ray fluorescence spectrometer includes: a sample stage 2 on which the sample 1, 14 is placed; an X-ray source 4 such as an X-ray tube which irradiates the sample 1, 14 with the primary X-rays 3; a spectroscopic device 6 which monochromates the secondary X-rays 5 such as fluorescent X-rays generated from the sample 1, 14; and a detector 8 on which secondary X-rays 7 monochromated by the spectroscopic device 6 are incident and which detects the intensity of the secondary X-rays 7. An output from the detector 8 is input, through an amplifier, a pulse height analyzer, a counting unit, and the like (not shown), to a control unit 11 such as a computer which controls the entire spectrometer.

The spectrometer is a wavelength dispersive and sequential X-ray fluorescence spectrometer, and includes an interlocking unit 10, i.e., a so-called goniometer, which interlocks the spectroscopic device 6 with the detector 8 so as to change the wavelength of the secondary X-rays 7 incident on the detector 8. When the secondary X-rays 5 are incident on the spectroscopic device 6 at a certain incident angle θ, an extended line 9 of the secondary X-rays 5 and the secondary X-rays 7 monochromated (diffracted) by the spectroscopic device 6 form a spectroscopic angle 20 which is twice the incident angle θ. To cause the secondary X-rays 7, which are monochromated while the spectroscopic angle 20 is changed, to be incident on the detector 8 while changing the wavelength of the secondary X-rays 7, the interlocking unit 10 rotates the spectroscopic device 6 around an axis O which passes the center of the surface of the spectroscopic device 6 and is perpendicular to the drawing sheet, and rotates the detector 8 around the axis O and around a circle 12 by an angle of twice the rotation angle of the spectroscopic device 6. The value of the spectroscopic angle 20 (angle 20) is input from the interlocking unit 10 to the control unit 11.

The spectrometer is provided with one or a plurality of standard samples 14 whose compositions are known and different from each other so as to correspond to an expected unknown sample 1 to be analyzed. These samples are placed on the sample stage 2 and subjected to quantitative analysis. The control unit 11 has an X-ray fluorescence analysis program 13A or 13B which allows the X-ray fluorescence spectrometer to execute the X-ray fluorescence analysis method of the first embodiment or the later-described second embodiment. The X-ray fluorescence analysis program and the X-ray fluorescence spectrometer are also embodiments of the present invention. In the present invention, the X-ray fluorescence spectrometer may be a wavelength dispersive and simultaneous multi-elements analysis type X-ray fluorescence spectrometer, or may be an energy dispersive X-ray fluorescence spectrometer.

Figure 1:
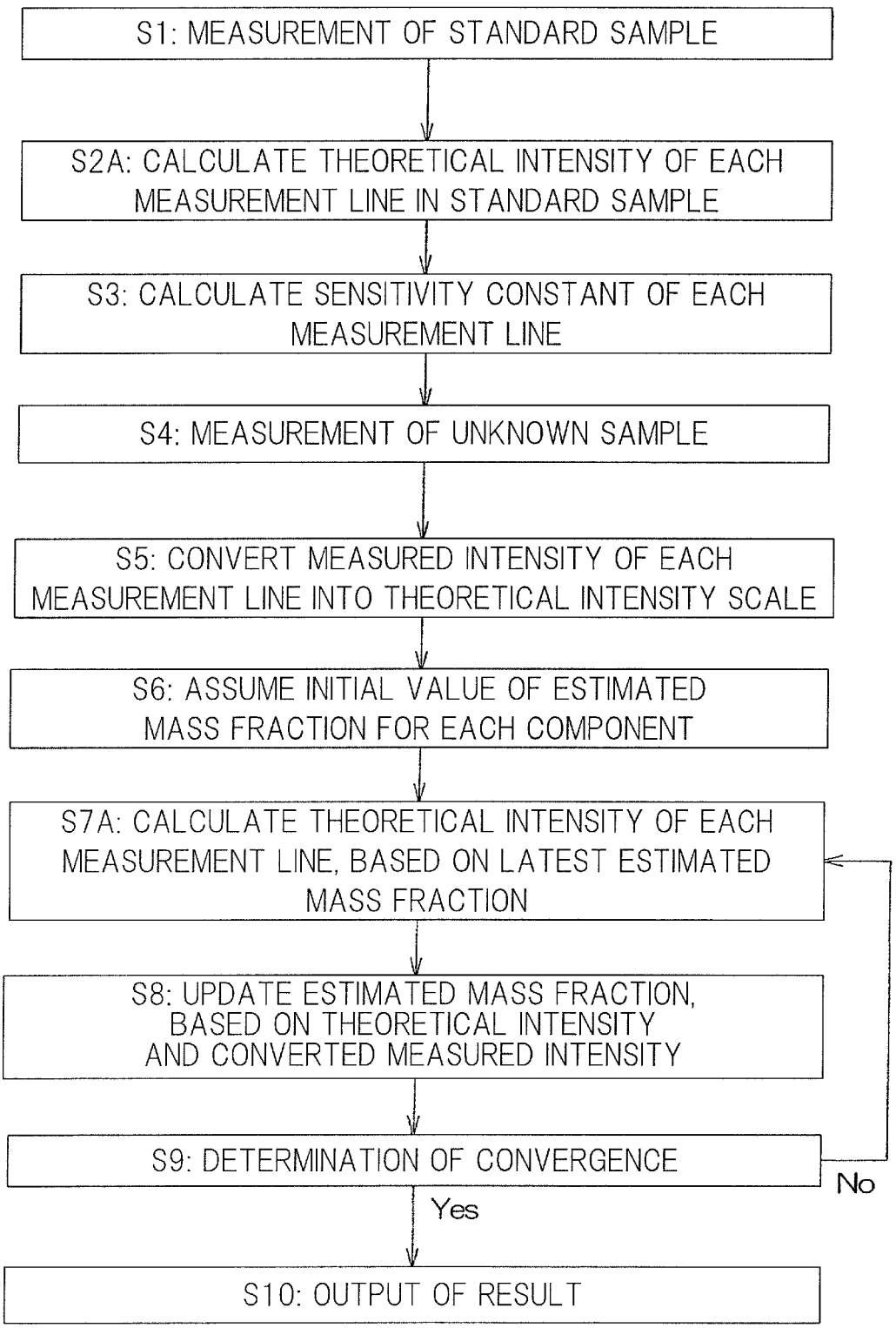
FIG. 1 is a flowchart showing an X-ray fluorescence analysis method according to a first embodiment of the present invention.

The X-ray fluorescence analysis method according to the first embodiment, using the aforementioned X-ray fluorescence spectrometer, will be described with reference to FIG. 1 showing a flowchart of the X-ray fluorescence analysis program 13A. First, in a standard sample measurement step S1, the standard sample 14, which contains elements or compounds as components and whose composition is known, is irradiated with the primary X-rays 3, and an intensity $I_i^{MS}$ of fluorescent X-rays 5 generated from the component i in the standard sample 14 is measured.

Next, in a standard sample theoretical intensity calculation step S2A, based on a known mass fraction $W_j$ (a numerical value obtained by dividing the content that is the percentage concentration by 100) of a component j in the standard sample 14, a theoretical intensity $I_i^{TS}$ of the fluorescent X-rays (measurement line) 5 generated from the component i in the standard sample 14 is calculated by using a predefined theoretical intensity formula. The theoretical intensity formula used here is simply represented as the following formula (3) or (4) in which, unlike the formulae (1) and (2) used for the conventional FP method, only in an absorption term relating to absorption of X-rays (a denominator of a right-hand side), the mass fraction $W_j$ of each component j is divided by the sum $\Sigma W_j$ of the mass fractions of all the components to obtain $W_j^N$, thereby normalizing the mass fraction $W_j$ of each component j so that the sum $W_j^N N = \Sigma(W_j/\Sigma W_j)$ of the mass fractions of all the components becomes 1. The theoretical intensity $I_i^T$ calculated for the standard sample 14 by the formula (3) is the theoretical intensity $I_i^{TS}$.

$$I_i^T = K_i W_i / \Sigma \mu_j (W_j / \Sigma W_j) \tag{3}$$

$$I_i^T = K_i W_i / \Sigma \mu_j W_j^N \tag{4}$$

In the formula (3), the denominator of the right-hand side is divided by the sum $\Sigma W_j$ of the mass fractions of all the components. Since this is equal to multiplying the numerator of the right-hand side by the sum $\Sigma W_j$ of the mass fractions of all the components, the formulae (3) and (4) are equivalent to the following formula (5).

$$I_i^T = (K_i W_i / \Sigma \mu_j W_j) \Sigma W_j \tag{5}$$

The theoretical intensity $I_i^T$ according to the formula (5) is equivalent to one obtained by multiplying the theoretical intensity $I_i^T$ according to the formula (1) used for the conventional FP method, by the sum $\Sigma W_j$ of the mass fractions of all the components. In the present invention, as the predefined theoretical intensity formula, the formula (5) may be used instead of the formula (3).

Next, in a sensitivity constant calculation step S3, based on the intensity $I_i^{MS}$ measured in the standard sample measurement step S1 and the theoretical intensity $I_i^{TS}$ calculated in the standard sample theoretical intensity calculation step S2A, a sensitivity constant $A_i$ is calculated by the following formula (6). Alternatively, the sensitivity constant may be obtained through a least square method by using a plurality of standard samples, and selecting a linear expression or a quadratic expression instead of the formula (6).

$$A_i = I_i^{TS}/I_i^{MS} \tag{6}$$

Next, in an unknown sample measurement step S4, the unknown sample 1, which contains elements or compounds as components and whose composition is unknown, is irradiated with the primary X-rays 3, and an intensity $I_i^M$ of fluorescent X-rays 5 generated from the component i in the unknown sample 1 is measured.

Next, in a conversion step S5, the intensity $I_i^M$ measured in the unknown sample measurement step S4 is converted to a theoretical intensity scale by using the sensitivity constant $A_i$ calculated in the sensitivity constant calculation step S3, according to the following formula (7), thereby obtaining a converted measured intensity $I_i^{MT}$.

$$I_i^{MT} = A_i \times I_i^M \tag{7}$$

Next, in an initial value assumption step S6, an initial value $W_i(1)^N$ of an estimated mass fraction for the component i in the unknown sample 1 is assumed according to the following formulae (8) and (9), where $I_i^P$ is a theoretical intensity of a pure substance of the component i.

$$W_i(0) = I_i^{MT}/I_i^P \tag{8}$$

$$W_i(1)^N = W_i(0)/\Sigma W_j(0) \tag{9}$$

Specifically, in the formula (8), the ratio of the converted measured intensity $I_i^{MT}$ to the theoretical intensity $I_i^P$ of the pure substance of the component i is regarded as a previous initial value $W_i(0)$. In the formula (9), the previous initial value $W_i(0)$ is divided by the sum $\Sigma W_j(0)$ of previous initial values of all the components, thereby normalizing the previous initial value $W_i(0)$ so that the sum $\Sigma W_j(1)^N = \Sigma(W_i(0)/\Sigma W_j(0))$ of the previous initial values of all the components becomes 1, and the normalized previous initial value $W_i(1)^N$ is assumed as the initial value $W_i(1)^N$ of the estimated mass fraction. In the estimated mass fraction $W_i(n)$, the numerical value n in round brackets is the number of iterations of estimation calculation with the initial value $W_i(1)^N$ being the first time.

Next, in an unknown sample theoretical intensity calculation step S7A in the iterative calculation, a theoretical intensity $I_i^T(n)$ of the fluorescent X-rays 5 generated from the component i in the unknown sample 1 is calculated based on a latest estimated mass fraction $W_i(n)$, according to the predefined theoretical intensity formula (3). That is, the theoretical intensity $I_i^T$ calculated for the latest estimated mass fraction $W_i(n)$ through the formula (3) is the n-th theoretical intensity $I_i^T(n)$. Regarding the mass fraction $W_i$ of the measurement component i for which a theoretical intensity $I_i^T$ is to be calculated, normalization thereof is not performed during the iterative calculation but is performed, according to the formula (9), in the initial value assumption step S6 immediately before entering the iterative calculation. Therefore, the latest estimated mass fraction $W_i(n)$ is normalized only in the first initial value $W_i(1)^N$.

Next, in an update step S8, the estimated mass fraction is updated from $W_i(n)$ to $W_i(n+1)$ according to the following formula (10), based on the theoretical intensity $I_i^T(n)$ calculated in the unknown sample theoretical intensity calculation step S7A and on the converted measured intensity $I_i^{MT}$ obtained in the conversion step S5.

$$W_i(n+1) = W_i(n) \times I_i^{MT}/I_i^T(n) \tag{10}$$

Next, in a convergence determination step S9, convergence determination is performed according to the following formula (11), based on the estimated mass fractions $W_i(n)$ and $W_i(n+1)$ before and after update in the update step S8 and on a predetermined convergence condition.

$$|W_i(n+1)/W_i(n) - 1.0| < \alpha \tag{11}$$

For example, if the formula (11) is not satisfied when $\alpha = 0.001$, the result of the determination is regarded as "not converged", and the procedure is returned to the unknown sample theoretical intensity calculation step S7A. Then, the steps from the unknown sample theoretical intensity calculation step S7A to the convergence determination step S9 are repeated with $W_i(n+1)$ being the latest estimated mass fraction. On the other hand, when the formula (11) is satisfied, and then if the number of iterations of estimation calculation with the initial value $W_i(1)^N$ being the first time is three or more, that is, when $n+1 \geq 3$ ($n+1 > 3$ or $n+1 = 3$) is satisfied, it is determined that the result of the determination is "converged", and the procedure proceeds to a result output step S10.

In the result output step S10, the latest estimated mass fraction $W_i(n+1)$ is output as a mass fraction $W_i$, to be obtained, of the component i in the unknown sample 1.

Figure 4:
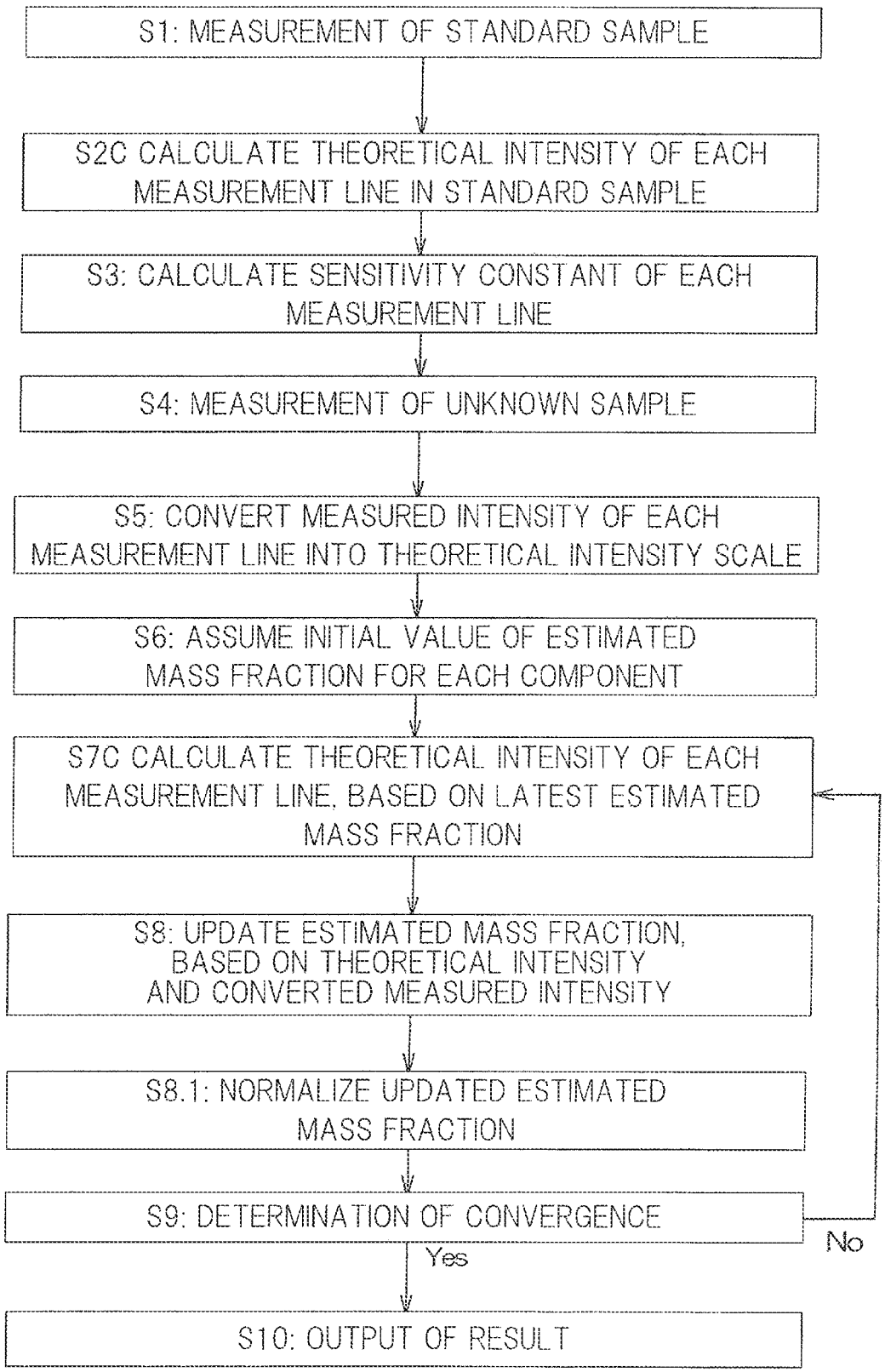
FIG. 4 is a flowchart showing an X-ray fluorescence analysis method according to a conventional FP method.

According to the X-ray fluorescence analysis method of the first embodiment and the conventional FP method, 11 elements in 5 standard samples 14 made of nickel alloy are analyzed. Table 1 shows: maximum and minimum contents of known chemical analysis values for each element; and accuracies for each element according to the respective methods. In Table 1, the "accuracy (before normalization)" of the conventional FP method is the accuracy obtained in the case where the latest estimated mass fraction $W_i(n+1)$, which is not yet normalized in the normalization step S8.1, is output in the result output step S10 of FIG. 4. Meanwhile, in the conventional FP method, usually, the latest estimated mass fraction $W_i(n+1)^N$, which has been normalized in the normalization step S8.1, is output in the result output step S10, and the accuracy obtained in this case is the "accuracy (after normalization)".

TABLE

| | | | | | unit: mass % | | | | | | |
|---|---|---|---|---|---|---|---|---|---|---|---|
| | Mn | Si | Cr | Ni | Co | Mo | W | Nb | Ti | Fe | Cu |
| Maximum content | 1.28 | 0.94 | 21.62 | 72.6 | 20.8 | 4.5 | 2.4 | 4.98 | 3.09 | 27.4 | 0.077 |
| Minimum content | 0.23 | 0.083 | 17.4 | 20.26 | 0.06 | 0 | 0 | 0 | 0.001 | 1.4 | 0 |

TABLE-continued unit: mass %

| | Mn | Si | Cr | Ni | Co | Mo | W | Nb | Ti | Fe | Cu |
|---|---|---|---|---|---|---|---|---|---|---|---|
| Conventional FP method | | | | | | | | | | | |
| Accuracy (after normalization) | 0.007 | 0.021 | 0.239 | 0.768 | 0.115 | 0.042 | 0.003 | 0.026 | 0.036 | 0.149 | 0.007 |
| Accuracy (before normalization) | 0.036 | 0.064 | 0.218 | 0.392 | 0.151 | 0.092 | 0.024 | 0.072 | 0.085 | 0.173 | 0.038 |
| FP method according to first embodiment | | | | | | | | | | | |
| Accuracy | 0.002 | 0.020 | 0.070 | 0.16 | 0.031 | 0.010 | 0.000 | 0.001 | 0.017 | 0.030 | 0.007 |

In the 5 standard samples 14, the sum of the contents of the 11 elements based on chemical analysis values ranges from 98.55% to 99.39%, that is, the sum of the mass fractions of the known components is not 1. Then, in each method, a sensitivity constant is obtained by using the standard samples 14. Next, quantitative analysis is performed using the standard samples 14 as unknown samples 1, thereby obtaining the accuracies based on quantitative errors from the known chemical analysis values. Each accuracy is a square root of a numerical value obtained by dividing a square sum of the quantitative errors of the standard samples 14 by 5 that is the number of the samples. As is apparent from Table 1, according to the X-ray fluorescence analysis method of the first embodiment, when the standard sample 14 in which the sum of the mass fractions of known components is not 1, the accuracy is significantly improved as compared with the conventional FP method.

As described, according to the X-ray fluorescence analysis method of the first embodiment, in the FP method, the theoretical intensity formula (3) is used in which, only in the absorption term relating to absorption of X-rays, the mass fraction $W_j$ of each component j is normalized so that the total of the mass fractions of all the components becomes 1. Therefore, the theoretical intensity $I_i^T$ of the measurement component i depends on the absolute mass fraction $W_j$ of each of the components j in the sample. Thus, even when the standard sample 14 in which the sum of the mass fractions of the known components is not 1 is used, it is possible to perform accurate analysis on the unknown sample 1. In addition, the normalization in the absorption term can be easily performed by dividing the mass fraction $W_j$ of each component j by the sum $\Sigma W_j$ of the mass fractions of all the components.

As for the X-ray fluorescence analysis method of the first embodiment, various modifications as follows are conceivable, and the same operation and effect as those of the first embodiment can be obtained also in the modifications. First, according to modification 1, a normalization step S8.1 may be provided between the update step S8 and the convergence determination step S9, as in the conventional FP method. In the normalization step S8.1, normalization is performed according to the following formula (12) such that the estimated mass fraction $W_i(n+1)$ of each component i, which has been updated in the update step S8, is divided by the sum $\Sigma W_j(n+1)$ of the estimated mass fractions of all the components to obtain $W_i(n+1)^N$, whereby the sum $\Sigma W_i(n+1)^N = \Sigma(W_i(n+1)/\Sigma W_j(n+1))$ of the estimated mass fractions of all the components becomes 1.

$$W_i(n+1)^N = W_i(n+1)/\Sigma W_j(n+1) \tag{12}$$

In the modification 1, in the convergence determination step S9, convergence determination may be performed based on either the non-normalized estimated mass fractions $W_i(n)$ and $W_i(n+1)$ before and after update or the normalized estimated mass fractions $W_i(n)^N$ and $W_i(n+1)^N$ before and after update. Also in the result output step S10, as the mass fraction $W_i$, to be obtained, of the component i in the unknown sample 1, either the latest non-normalized estimated mass fraction $W_i(n+1)$ or the latest normalized estimated mass fraction $W_i(n+1)^N$ may be output. However, in the case where the determination result in the convergence determination step S9 is "not converged" and the procedure is returned to the unknown sample theoretical intensity calculation step S7A, the latest estimated mass fraction is the latest normalized estimated mass fraction $W_i(n+1)^N$.

Further, although departing from the present invention, in modification 2, the theoretical intensity formula used in the unknown sample theoretical intensity calculation step S7A of modification 1 may be changed from the formula (3) to the formula (1) used in the conventional FP method.

Figure 2:
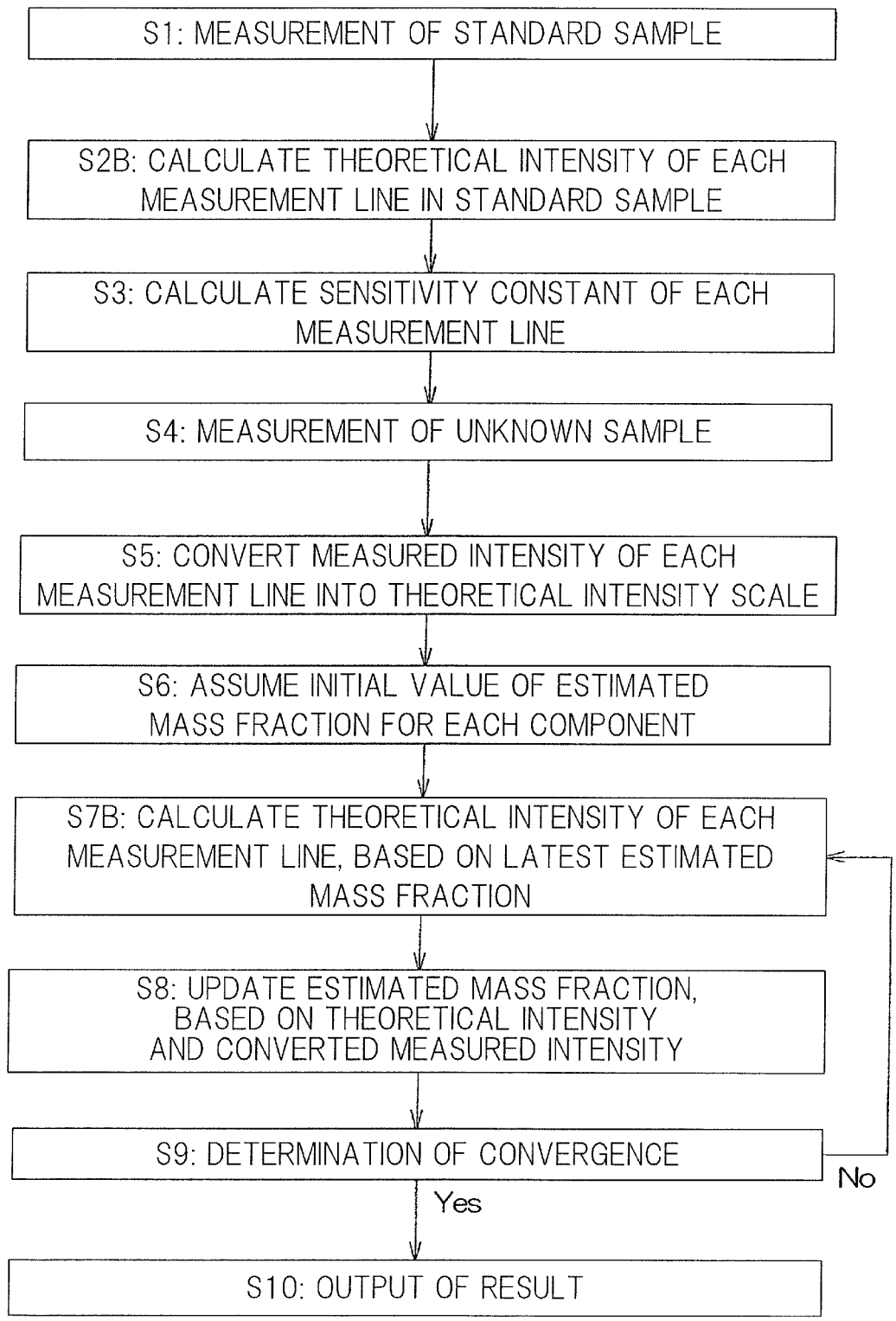
FIG. 2 is a flowchart showing an X-ray fluorescence analysis method according to a second embodiment of the present invention.

Next, an X-ray fluorescence analysis method according to a second embodiment will be described with reference to FIG. 2 showing a flowchart of the X-ray fluorescence analysis program 13B shown in FIG. 3. The X-ray fluorescence analysis method of the second embodiment is identical to the X-ray fluorescence analysis method of the first embodiment except that a predefined theoretical intensity formula used in a standard sample theoretical intensity calculation step S2B and an unknown sample theoretical intensity calculation step S7B is different from the predefined theoretical intensity formula (3) used in the standard sample theoretical intensity calculation step S2A and the unknown sample theoretical intensity calculation step S7A in the X-ray fluorescence analysis method of the first embodiment. Since the rest of the configuration of the second embodiment is the same as that of the first embodiment, only the theoretical intensity formula will be described.

The theoretical intensity formula is represented by the following formulae (13) and (14), in which, only in an absorption term relating to absorption of X-rays (a denominator of a right-hand side in formula (13)), a mass fraction $W_{ib}$ of a base component ib specified for each component i is set to a value obtained by subtracting, from 1, a sum $\Sigma_{j \neq ib} W_j$ of mass fractions of components other than the base component ib, thereby normalizing the mass fraction $W_j$ of each component j so that the sum $\Sigma W_j$ of the mass fractions of all the components becomes 1.

$$I_i^T = K_i W_i / (\Sigma_{j \neq ib} \mu_j W_j + \mu_{ib} W_{ib}) \tag{13}$$

$$W_{ib} = 1.0 - \Sigma_{j \neq b} W_j \tag{14}$$

The X-ray fluorescence analysis method of the second embodiment is verified through simulations as follows.

First, a standard sample 14 is assumed which is composed of two elements, Fe and Ni, and in which a mass fraction $W_{Fe}$ of Fe is 0.50, a mass fraction $W_{Ni}$ of Ni is 0.49, and the sum of the mass fractions of all the components is not 1 but 0.99. Fluorescent X-rays to be measured are Fe—Kα line and Ni—Kα line. A measurement intensity $I_{Fe}^{MS}$ of Fe—Kα line is 200.0, and a measurement intensity $I_{Ni}^{MS}$ of Ni—Kα line is 100.0. As for Fe, Ni is specified as a base component. As for Ni, Fe is specified as a base component.

According to the above setting, a theoretical intensity $I_{Fe}^{TS}=2753.6$ of Fe—Kα line and a theoretical intensity $I_{Ni}^{TS}=1278.1$ of Ni—Kα line are calculated in the standard sample theoretical intensity calculation step S2B, and a sensitivity constant $A_{Fe}=13.768$ of Fe—Kα line and a sensitivity constant $A_{Ni}=12.781$ of Ni—Kα line are calculated in the sensitivity constant calculation step S3.

Next, the standard sample 14 assumed as described above is used as an unknown sample 1, and the measurement intensities $I_{Fe}^{M}$ and $I_{Ni}^{M}$ of Fe—Kα line and Ni—Kα line are similarly set to 200.0 and 100.0, respectively. Converted measurement intensities $I_{Fe}^{MT}$ and $I_{Ni}^{MT}$ obtained in the conversion step S5 are equal to the theoretical intensities $I_{Fe}^{TS}$ and $I_{Ni}^{TS}$ calculated for the standard sample 14, respectively, that is, the converted measured intensity $I_{Fe}^{MT}$ of Fe—Kα line is 2753.6, and the converted measured intensity $I_{Ni}^{MT}$ of Ni—Kα line is 1278.1. In the initial value assumption step S6, first, theoretical intensities $I_{Fe}^{P}$ and $I_{Ni}^{P}$ of pure substances of Fe and Ni are calculated to be 4615.2 and 5343.5, respectively, and initial values $W_{Fe}(1)^{N}=0.7138$ and $W_{Ni}(1)^{N}=0.2862$ of estimated mass fractions are obtained through formulae (8) and (9).

Table 2 shows the theoretical intensity $I_i^{T}(n)$ obtained in the unknown sample theoretical intensity calculation step S7B and the estimated mass fraction $W_i(n+1)$ after update in the update step S8, up to n=10, during the subsequent iterative calculation. In Table 2, a superscript B indicates that the corresponding value is not normalized.

TABLE 2

| | | Fe mass fraction | Fe theoretical intensity | Ni mass fraction | Ni theoretical intensity |
|---|---|---|---|---|---|
| Measured intensity (theoretical intensity scale) | $I_i^{TM}$ | | (2753.6) | | (1278.1) |
| Pure substance theoretical intensity | $I_i^{P}$ | | 4615.2 | | 5343.5 |
| Initial mass fraction (normalized) | $W_i^{B}(1)$ | 0.7138 | | 0.2862 | |
| Theoretical intensity | $I_i^{T}(1)$ | | 3569.1 | | 626.8 |
| Estimated mass fraction | $W_i^{B}(2)$ | 0.5507 | | 0.5835 | |
| Theoretical intensity | $I_i^{T}(2)$ | | 2953.5 | | 1670.4 |
| Estimated mass fraction | $W_i^{B}(3)$ | 0.5135 | | 0.4464 | |
| Theoretical intensity | $I_i^{T}(3)$ | | 2807.3 | | 1118.5 |
| Estimated mass fraction | $W_i^{B}(4)$ | 0.5037 | | 0.5101 | |
| Theoretical intensity | $I_i^{T}(4)$ | | 2768.3 | | 1356.4 |
| Estimated mass fraction | $W_i^{B}(5)$ | 0.5010 | | 0.4807 | |
| Theoretical intensity | $I_i^{T}(5)$ | | 2757.7 | | 1242.8 |
| Estimated mass fraction | $W_i^{B}(6)$ | 0.5003 | | 0.4943 | |
| Theoretical intensity | $I_i^{T}(6)$ | | 2754.7 | | 1294.6 |
| Estimated mass fraction | $W_i^{B}(7)$ | 0.5001 | | 0.4880 | |
| Theoretical intensity | $I_i^{T}(7)$ | | 2754.0 | | 1270.4 |
| Estimated mass fraction | $W_i^{B}(8)$ | 0.5000 | | 0.4909 | |
| Theoretical intensity | $I_i^{T}(8)$ | | 2753.7 | | 1281.7 |
| Estimated mass fraction | $W_i^{B}(9)$ | 0.5000 | | 0.4896 | |
| Theoretical intensity | $I_i^{T}(9)$ | | 2753.7 | | 1276.4 |
| Estimated mass fraction | $W_i^{B}(10)$ | 0.5000 | | 0.4902 | |
| Theoretical intensity | $I_i^{T}(10)$ | | 2753.6 | | 1278.8 |
| Estimated mass fraction | $W_i^{B}(11)$ | 0.5000 | | 0.4899 | |

As is apparent from Table 2, according to the X-ray fluorescence analysis method of the second embodiment, even when the standard sample 14 in which the sum of the mass fractions of known components is not 1 is used, the estimated mass fraction is appropriately converged to a true value.

Also in the X-ray fluorescence analysis method of the second embodiment, in the FP method, the theoretical intensity formulae (13) and (14) are used in which, only in the absorption term relating to absorption of X-rays, the mass fraction $W_j$ of each component j is normalized so that the total of the mass fractions of all the components becomes 1. Therefore, the theoretical intensity $I_i^{T}$ of the measurement component i depends on the absolute mass fraction $W_j$ of each of the components j in the sample. Thus, even when the standard sample 14 in which the sum of the mass fractions of known components is not 1 is used, accurate analysis of the unknown sample 1 can be performed.

In the X-ray fluorescence analysis method of the first embodiment, the simple formula (3) or (5) in which primary X-rays have a single wavelength, and which does not include the intensity of fluorescent X-rays due to secondary excitation, is used. However, the X-ray fluorescence analysis method of the first embodiment may use the following formulae (5-1), (5-2), (5-3), (5-4) and (5-5), or the following formulae (5-6), (2-2), (2-3) and (2-4) so as to include wave range integration of primary X-rays and the intensity of fluorescent X-rays due to secondary excitation.

$$R_{ip} = W_i \int_{\lambda_{min}}^{\lambda_e^i} \frac{I_0(\lambda)\tau_{ip}(\lambda)}{m'(\lambda) + m'(\lambda_{ip})} \left[ 1 + \frac{1}{2} \sum_{jq} W_j' F(jq, \lambda) \right. \quad (5\text{-}1)$$

$$\left. \left\{ \frac{\log\left(1 + \frac{m'(ip)}{\mu'(jq)}\right)}{m'(ip)} + \frac{\log\left(1 + \frac{m'(\lambda)}{\mu'(iq)}\right)}{m'(\lambda)} \right\} \right] d\lambda$$

where the X-ray intensity is $R_{ip}$, and in the formula (1), corresponds to the X-ray intensity obtained when the mass fraction of the i element is 1.0, that is, $R_{ip}=I_i/K_i$ is satisfied.

However, each symbol with an apostrophe is represented by the mass fraction normalized by the sum of the mass fractions of all the components, as described below.

$$m'(\lambda) = \Sigma_k \mu_k(\lambda) W'_k / \sin \phi \quad (5\text{-}2)$$

$$m'(ip) = \Sigma_k \mu_k(ip) W'_k / \sin \psi \quad (5\text{-}3)$$

$$\mu'(jq) = \Sigma_k \mu_k(jq) W'_k \quad (5\text{-}4)$$

$$W'_k = W_k / \Sigma_l W'_l \quad (5\text{-}5)$$

The above formulae are rewritten as follows.

$$R_{ip} = W_i \int_{\lambda_{min}}^{\lambda_e^i} \frac{I_0(\lambda) \tau_{ip}(\lambda)}{m(\lambda) + m(\lambda_{ip})} \left[ 1 + \right. \quad (5\text{-}6)$$

$$\left. \frac{1}{2} \sum_{jq} W_j F(jq, \lambda) \left\{ \frac{\log\left(1 + \frac{m(ip)}{\mu(jq)}\right)}{m(ip)} + \frac{\log\left(1 + \frac{m(\lambda)}{\mu(iq)}\right)}{m(\lambda)} \right\} \right] d\lambda \sum W_k$$

However, the term relating to absorption of X-rays is calculated by the following formulae.

$$m(\lambda) = \Sigma_k \mu_k(\lambda) W_k / \sin \phi \quad (2\text{-}2)$$

$$m(ip) = \Sigma_k \mu_k(ip) W_k / \sin \psi \quad (2\text{-}3)$$

$$\mu(jq) = \Sigma_k \mu_k(jq) W_k \quad (2\text{-}4)$$

In formula (5-1), the theoretical intensity of the fluorescent X-rays due to secondary excitation is included in the theoretical intensity of the fluorescent X-rays to be calculated. When, only in the absorption term relating to absorption of X-rays, the mass fraction of each component is normalized so that the sum of the mass fractions of all the components becomes 1, not only the absorption term relating to absorption of fluorescent X-rays due to secondary excitation (the term in curly brackets in formula (5-1), for example) but also the term relating to the mass fraction of the secondary-excited component ($W'_j$ in square brackets in formula (5-1), for example) is included in the object to be normalized.

Likewise, in the X-ray fluorescence analysis method of the second embodiment, the simple formula (13) or (14) in which primary X-rays have a single wavelength, and which does not include the intensity of the fluorescent X-rays due to secondary excitation, is used. However, the X-ray fluorescence analysis method of the second embodiment may use the following formulae (2-1), (14-1), (14-2) and (14-3) and the aforementioned formula (14) so as to include wave range integration of primary X-rays and the intensity of fluorescent X-rays due to secondary excitation.

$$R_{ip} = W_i \int_{\lambda_{min}}^{\lambda_e^i} \frac{I_0(\lambda) \tau_{ip}(\lambda)}{m(\lambda) + m(\lambda_{ip})} \left[ 1 + \frac{1}{2} \sum_{jq} W_j F(jq, \lambda) \right. \quad (2\text{-}1)$$

$$\left. \left\{ \frac{\log\left(1 + \frac{m'(ip)}{\mu'(jq)}\right)}{m'(ip)} + \frac{\log\left(1 + \frac{m'(\lambda)}{\mu'(iq)}\right)}{m'(\lambda)} \right\} \right] d\lambda$$

$$m(\lambda) = \left( \sum_{k \neq ib} \mu_k(\lambda) W_k + \mu_{ib}(\lambda) W_{ib} \right) / \sin \phi \quad (14\text{-}1)$$

$$m(ip) = \left( \sum_{k \neq ib} \mu_k(ip) W_k + \mu_{ib}(ip) W_{ib} \right) / \sin \psi \quad (14\text{-}2)$$

$$\mu(jq) = \sum_{k \neq ib} \mu_k(jq) W_k + \mu_{ib}(jq) W_{ib} \quad (14\text{-}3)$$

In formula (2-1), "½" and the subsequent portion in square brackets correspond to the term relating to secondary excitation, $W_j$ is the mass fraction of the component to be secondarily excited, and $F(jq,\lambda)$ corresponds to the product of photoelectric absorption coefficient, transition probability, fluorescence yield, and jump ratio. The product of $W_j$ and photoelectric absorption coefficient is the degree of photoelectric absorption of the primary X-rays into the secondary-excited component. Meanwhile, a portion in curly brackets corresponds to the term relating to absorption of fluorescent X-rays due to secondary excitation (Reference Document: Y. Kataoka, "STANDARDLESS X-RAY FLUORESCENCE SPECTROMETRY (Fundamental Parameter Method using Sensitivity Library)", THE RIGAKU JOURNAL, 1989, Vol. 6, No. 1, p. 33-39).

Although the present invention has been fully described in connection with the preferred embodiments thereof with reference to the accompanying drawings which are used only for the purpose of illustration, those skilled in the art will readily conceive numerous changes and modifications within the framework of obviousness upon the reading of the specification herein presented of the present invention. Accordingly, such changes and modifications are, unless they depart from the scope of the present invention as delivered from the claims annexed hereto, to be construed as included therein.

REFERENCE NUMERALS

1 . . . unknown sample
3 . . . primary X-rays
5 . . . fluorescent X-rays
13A, 13B . . . X-ray fluorescence analysis program
14 . . . standard sample
S1 . . . standard sample measurement step
S2A, S2B . . . standard sample theoretical intensity calculation step
S3 . . . sensitivity constant calculation step
S4 . . . unknown sample measurement step
S5 . . . conversion step
S6 . . . initial value assumption step
S7A, S7B . . . unknown sample theoretical intensity calculation step
S8 . . . update step
S9 . . . convergence determination step
S10 . . . result output step

What is claimed is:

1. An X-ray fluorescence analysis method comprising:
a standard sample measurement step of irradiating a standard sample, which contains elements or compounds as components and whose composition is known, with primary X-rays, and measuring an intensity of fluorescent X-rays generated from the component in the standard sample;
a standard sample theoretical intensity calculation step of calculating a theoretical intensity of the fluorescent X-rays generated from the component in the standard sample, based on a mass fraction of the component in the standard sample, by using a predefined theoretical intensity formula;
a sensitivity constant calculation step of calculating a sensitivity constant, based on the intensity measured in the standard sample measurement step and the theoretical intensity calculated in the standard sample theoretical intensity calculation step;

an unknown sample measurement step of irradiating an unknown sample, which contains elements or compounds as components and whose composition is unknown, with the primary X-rays, and measuring an intensity of fluorescent X-rays generated from the component in the unknown sample;

a conversion step of converting the intensity measured in the unknown sample measurement step into a theoretical intensity scale by using the sensitivity constant, to obtain a converted measured intensity;

an initial value assumption step of assuming an initial value of an estimated mass fraction for the component in the unknown sample and normalizing the estimated mass fraction of each component, such that the sum of the estimated mass fraction of each component becomes 1, by obtaining the estimated mass fraction of each component by dividing mass fractions of each component by a sum of the mass fractions of each component, wherein the sum of the mass fractions of each component is other than 1;

an unknown sample theoretical intensity calculation step of calculating a theoretical intensity of the fluorescent X-rays generated from the component in the unknown sample, based on a latest estimated mass fraction, by using the predefined theoretical intensity formula;

an update step of updating the estimated mass fraction, based on the theoretical intensity calculated in the unknown sample theoretical intensity calculation step and on the converted measured intensity obtained in the conversion step;

a convergence determination step of performing convergence determination, based on the estimated mass fractions before and after update in the update step and on a predetermined convergence condition; and a result output step of outputting a latest estimated mass fraction as a mass fraction, to be obtained, of the component in the unknown sample, wherein when a result of determination in the convergence determination step is "not converged", the convergence determination step is followed by the unknown sample theoretical intensity calculation step, whereas, when the result of determination in the convergence determination step is "converged", the convergence determination step is followed by the result output step, and in the predefined theoretical intensity formula used in the standard sample theoretical intensity calculation step and the unknown sample theoretical intensity calculation step, the mass fraction of each component is normalized, only in an absorption term relating to absorption of X-rays, so that a sum of the mass fractions of all the components becomes 1.

2. The X-ray fluorescence analysis method as claimed in claim 1, wherein in the predefined theoretical intensity formula used in the standard sample theoretical intensity calculation step and the unknown sample theoretical intensity calculation step, the mass fraction of each component is normalized, only in the absorption term relating to absorption of X-rays, by dividing the mass fraction of the component by the sum of the mass fractions of all the components.

3. The X-ray fluorescence analysis method as claimed in claim 1, wherein in the predefined theoretical intensity formula used in the standard sample theoretical intensity calculation step and the unknown sample theoretical intensity calculation step, the mass fraction of each component is normalized, only in the absorption term relating to absorption of X-rays, by setting a mass fraction of a base component specified for each component to a value obtained by subtracting, from 1, a sum of mass fractions of components other than the base component.

4. A non-transitory computer readable medium comprising an X-ray fluorescence analysis program configured to cause an X-ray fluorescence spectrometer to execute an X-ray fluorescence analysis method, comprising:

a standard sample measurement step of irradiating a standard sample, which contains elements or compounds as components and whose composition is known, with primary X-rays, and measuring an intensity of fluorescent X-rays generated from the component in the standard sample;

a standard sample theoretical intensity calculation step of calculating a theoretical intensity of the fluorescent X-rays generated from the component in the standard sample, based on a mass fraction of the component in the standard sample, by using a predefined theoretical intensity formula;

a sensitivity constant calculation step of calculating a sensitivity constant, based on the intensity measured in the standard sample measurement step and the theoretical intensity calculated in the standard sample theoretical intensity calculation step;

an unknown sample measurement step of irradiating an unknown sample, which contains elements or compounds as components and whose composition is unknown, with the primary X-rays, and measuring an intensity of fluorescent X-rays generated from the component in the unknown sample;

a conversion step of converting the intensity measured in the unknown sample measurement step into a theoretical intensity scale by using the sensitivity constant, to obtain a converted measured intensity;

an initial value assumption step of assuming an initial value of an estimated mass fraction for the component in the unknown sample and normalizing the estimated mass fraction of each component, such that the sum of the estimated mass fraction of each component becomes 1, by obtaining the estimated mass fraction of each component by dividing mass fractions of each component by a sum of the mass fractions of each component, wherein the sum of the mass fractions of each component is other than 1;

an unknown sample theoretical intensity calculation step of calculating a theoretical intensity of the fluorescent X-rays generated from the component in the unknown sample, based on a latest estimated mass fraction, by using the predefined theoretical intensity formula;

an update step of updating the estimated mass fraction, based on the theoretical intensity calculated in the unknown sample theoretical intensity calculation step and on the converted measured intensity obtained in the conversion step;

a convergence determination step of performing convergence determination, based on the estimated mass fractions before and after update in the update step and on a predetermined convergence condition; and a result output step of outputting a latest estimated mass fraction as a mass fraction, to be obtained, of the component in the unknown sample, wherein when a result of determination in the convergence determination step is "not converged", the convergence determination step is followed by the unknown sample theoretical intensity calculation step, whereas, when the result of determination in the convergence determination step is "converged", the convergence determination step is followed by the result output step, and in the predefined theoretical intensity formula used in the standard sample theoretical intensity calculation step and the unknown sample theoretical intensity calculation step, the mass fraction of each component is normalized, only in an absorption term relating to absorption of X-rays, so that a sum of the mass fractions of all the components becomes 1.

5. An X-ray fluorescence spectrometer provided with a non-transitory computer readable medium comprising an X-ray fluorescence analysis program configured to cause the X-ray fluorescence spectrometer to execute an X-ray fluorescence analysis method comprising:

a standard sample measurement step of irradiating a standard sample, which contains elements or compounds as components and whose composition is known, with primary X-rays, and measuring an intensity of fluorescent X-rays generated from the component in the standard sample;

a standard sample theoretical intensity calculation step of calculating a theoretical intensity of the fluorescent X-rays generated from the component in the standard sample, based on a mass fraction of the component in the standard sample, by using a predefined theoretical intensity formula;

a sensitivity constant calculation step of calculating a sensitivity constant, based on the intensity measured in the standard sample measurement step and the theoretical intensity calculated in the standard sample theoretical intensity calculation step;

an unknown sample measurement step of irradiating an unknown sample, which contains elements or compounds as components and whose composition is unknown, with the primary X-rays, and measuring an intensity of fluorescent X-rays generated from the component in the unknown sample;

a conversion step of converting the intensity measured in the unknown sample measurement step into a theoretical intensity scale by using the sensitivity constant, to obtain a converted measured intensity;

an initial value assumption step of assuming an initial value of an estimated mass fraction for the component in the unknown sample and normalizing the estimated mass fraction of each component, such that the sum of the estimated mass fraction of each component becomes 1, by obtaining the estimated mass fraction of each component by dividing mass fractions of each component by a sum of the mass fractions of each component, wherein the sum of the mass fractions of each component is other than 1;

an unknown sample theoretical intensity calculation step of calculating a theoretical intensity of the fluorescent X-rays generated from the component in the unknown sample, based on a latest estimated mass fraction, by using the predefined theoretical intensity formula;

an update step of updating the estimated mass fraction, based on the theoretical intensity calculated in the unknown sample theoretical intensity calculation step and on the converted measured intensity obtained in the conversion step;

a convergence determination step of performing convergence determination, based on the estimated mass fractions before and after update in the update step and on a predetermined convergence condition; and a result output step of outputting a latest estimated mass fraction as a mass fraction, to be obtained, of the component in the unknown sample, wherein when a result of determination in the convergence determination step is "not converged", the convergence determination step is followed by the unknown sample theoretical intensity calculation step, whereas, when the result of determination in the convergence determination step is "converged", the convergence determination step is followed by the result output step, and in the predefined theoretical intensity formula used in the standard sample theoretical intensity calculation step and the unknown sample theoretical intensity calculation step, the mass fraction of each component is normalized, only in an absorption term relating to absorption of X-rays, so that a sum of the mass fractions of all the components becomes 1.

* * * * *